Jan. 12, 1943.   J. W. PAGE   2,308,299
BRAKE CONTROL MECHANISM
Filed Dec. 22, 1941   4 Sheets-Sheet 1

Inventor:
John W. Page,
By Clinton, Wiley, Davies & Hinkle,
Attys.

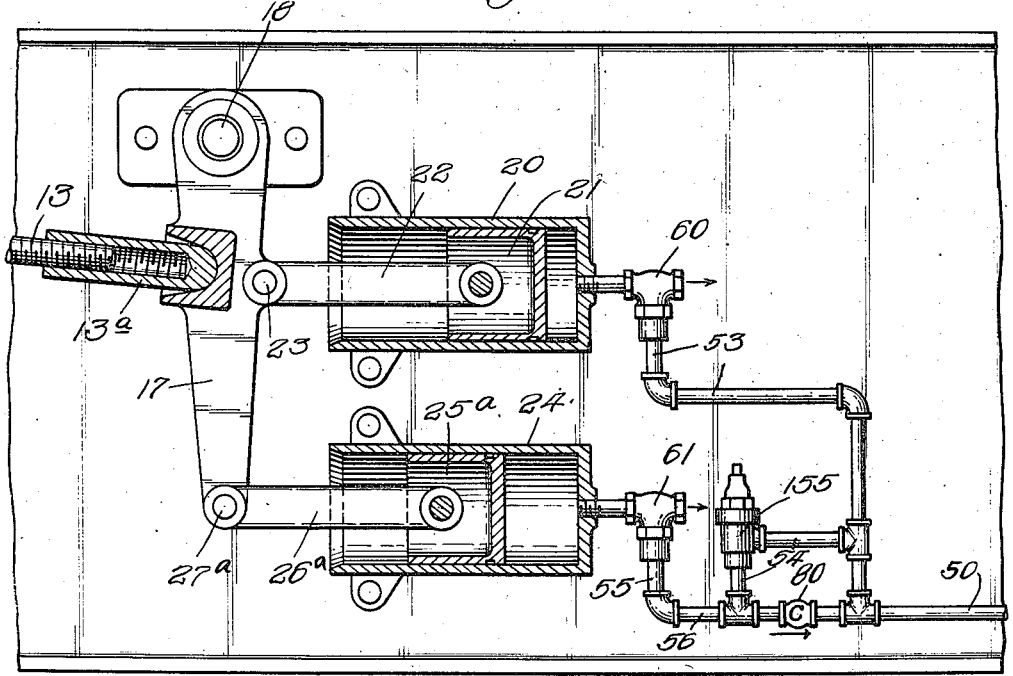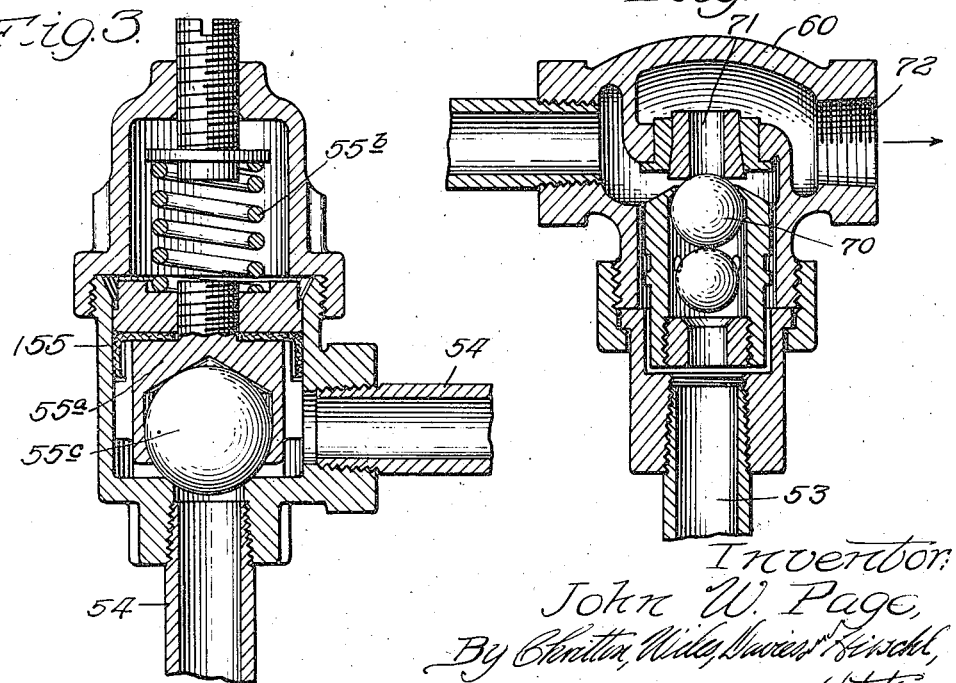

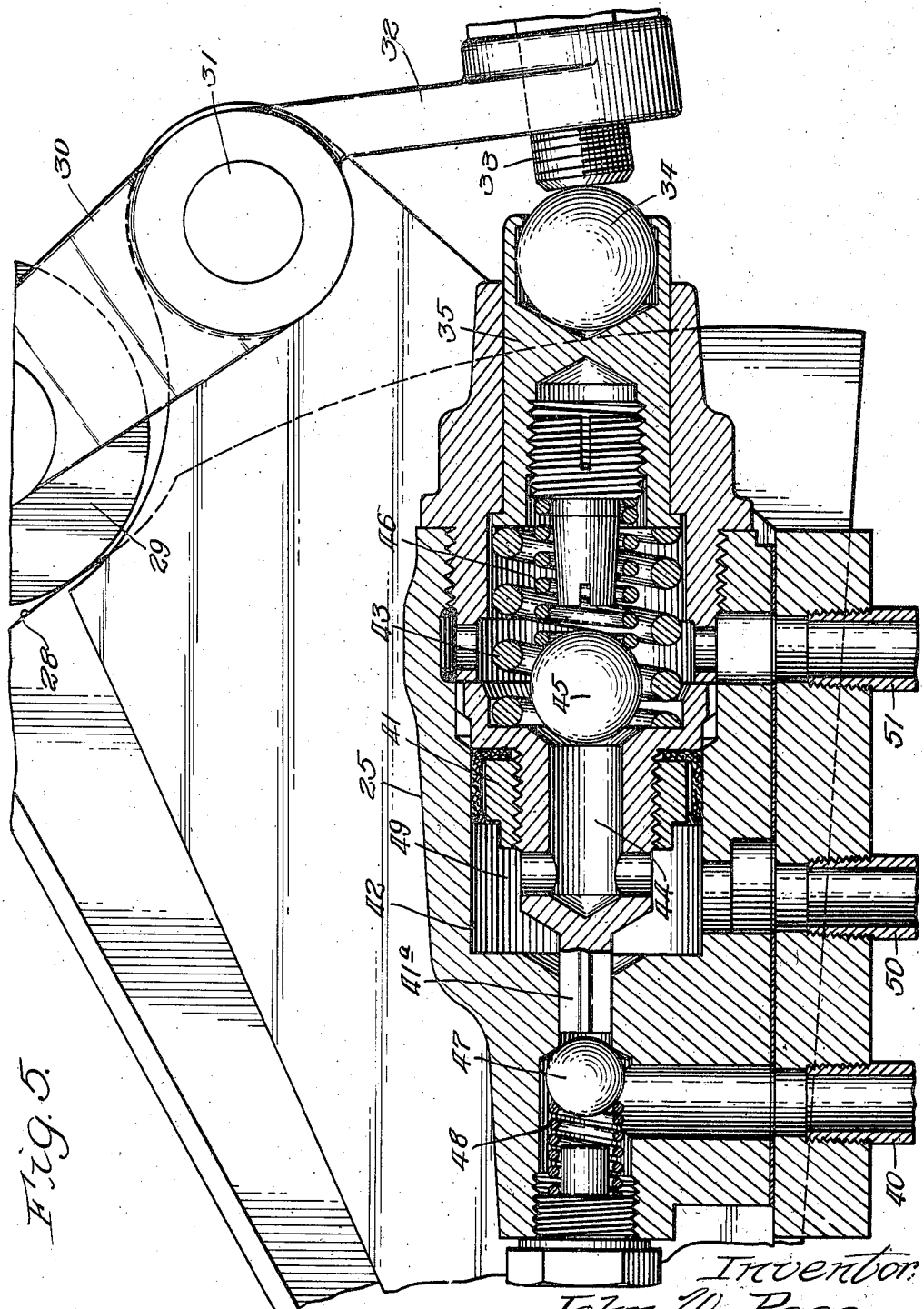

Jan. 12, 1943.    J. W. PAGE    2,308,299
BRAKE CONTROL MECHANISM
Filed Dec. 22, 1941    4 Sheets-Sheet 4

Inventor:
John W. Page,
By Chritton, Wiles, Davies & Hirsch,
Attys.

Patented Jan. 12, 1943

2,308,299

UNITED STATES PATENT OFFICE 2,308,299

BRAKE CONTROL MECHANISM

John W. Page, Chicago, Ill., assignor to Page Engineering Company, a corporation of Illinois Application December 22, 1941, Serial No. 424,072

5 Claims. (Cl. 188—170)

This invention relates to improvements in brake control mechanism and more especially pneumatic release mechanism for a spring-held brake.

My invention is particularly applicable for use in connection with the operation of a brake where slippage is desired. For example, in connection with the use of excavating, dredging and digging apparatus it is frequently necessary or desirable to permit controlled slippage of a brake for the purpose of gradually lowering a bucket or the like. In apparatus of this kind it is customary to provide a spring constantly tending to set or hold the brake so that in the event of any failure of the control mechanism the brake will normally remain set or locked. On the other hand, since slippage is necessary in the ordinary usage of the apparatus, means must be provided for releasing the brake gradually and maintaining the same under control. It is also, of course, necessary at times to give full release to the brake.

In apparatus of the kind described it is necessary to provide a very strong spring tending to set the brake. In connection with the release mechanism, difficulty has been encountered in providing a delicate partial release to provide slippage and in providing means for giving full release when desired. It is obvious that as the spring is compressed, additional force is required. A relatively slight force will suffice to give a slight compression to the spring to permit the desired slippage, but a relatively greater force is necessary in order to compress the spring further in order to give full release to the brake.

One of the features of my invention is the provision of pneumatic release means for the brake adapted to apply relatively slight force at first to the spring to permit the necessary slippage of the brake and adapted upon further movement of the controlling member to apply greater force to completely release the brake.

Other features of my invention are the improved air control mechanism for applying the desired pressures in the operation of the device, improved valves, improved pneumatic cylinders, connections, linkages and the like.

Other features and advantages of my invention will appear more fully as I proceed with my specification.

Figure 1:
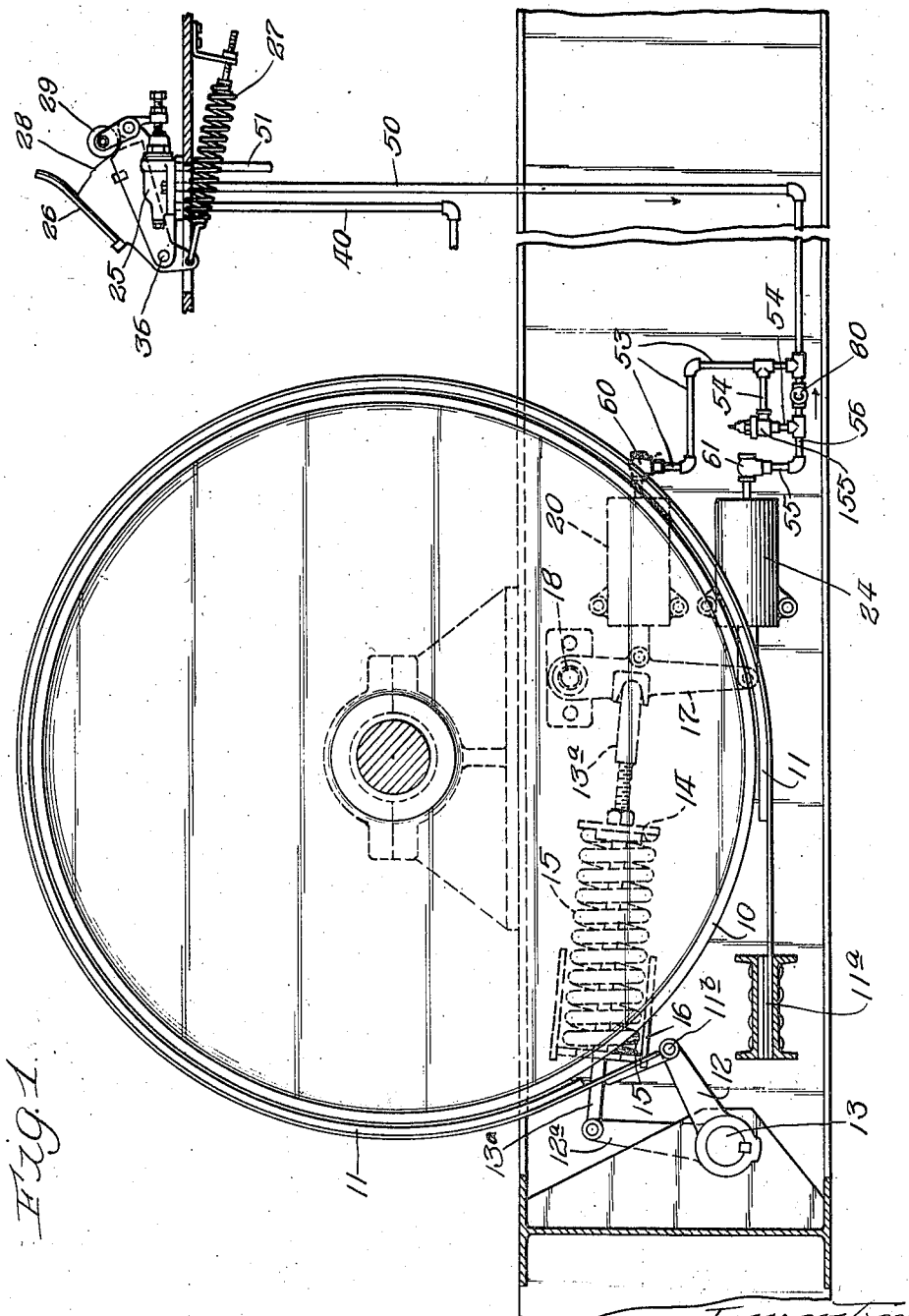
Figure 6:
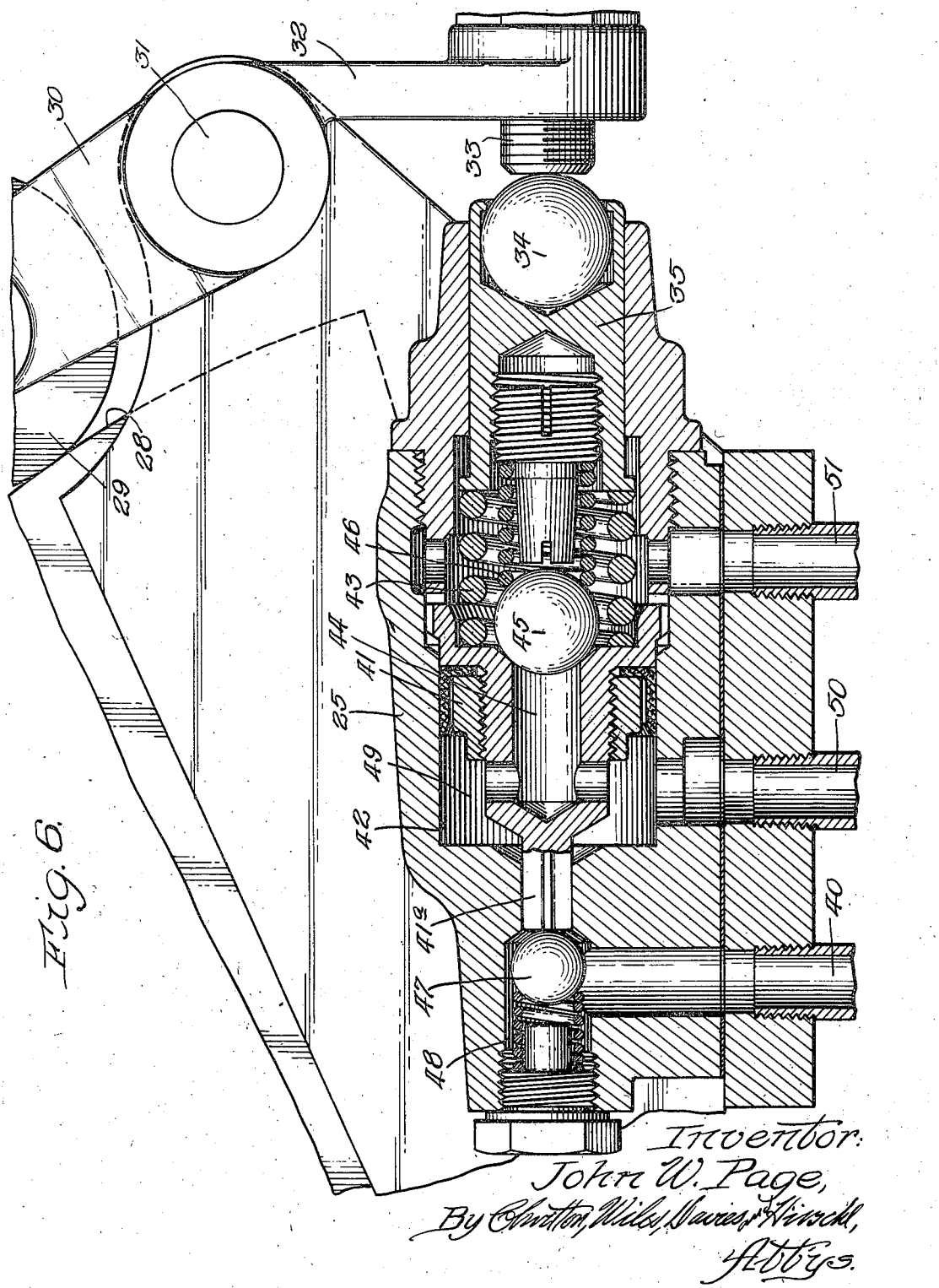

In that form of device embodying the features of my invention illustrated in the accompanying drawings, Fig. 1 is a view in side elevation; Fig. 2 is a sectional view of the pneumatic cylinders; Fig. 3 is a vertical sectional view of the pressure regulator valve; Fig. 4 is a vertical sectional view of one of the relief valves; Fig. 5 is a vertical sectional view of the main control valve with the pedal completely depressed; and Fig. 6 is a similar view with the pedal completely up.

As shown in the drawings, 10 indicates a brake wheel and 11 a brake band anchored at one end 11a with the other end 11b fastened to the bell crank 12 pivoted at 13. One arm 12a of the bell crank is connected to the rod 13a provided with the plate 14 lying against one end of the compression spring 15 which has its other end seated in the socket 16. Pressure of the compression spring 15 tends at all times to rock the bell crank 12 to contact the brake drum 11 to set the brake.

The rod 13 is extended as indicated by 13a and has its outer end fastened to the lever 17 pivoted at 18. See Fig. 1. Swinging of the lever 17 to the left (as viewed in Fig. 1) will compress the spring 15 to loosen the brake band 11.

A compressed air and control mechanism valve is provided for loosening the brake band 11 to permit slippage of the brake or to give full release as desired. 20 indicates an upper pneumatic cylinder with a piston 21 and piston rod 22 connected to the lever 17 at a point 23 which is relatively close to the pivot point 18 of said lever. 24 indicates a lower pneumatic cylinder with a piston 25a having a piston rod 26a connected at 27a to the end of the lever 17, or at a point a relatively greater distance from the pivot point 18. It will be seen that the upper pneumatic cylinder 20 has a relatively short leverage on the lever 17 and the lower cylinder 24 has a relatively long leverage. By this construction it will be seen that with equal pressure in the cylinders, the lower cylinder 24 will exert a greater force to compress the spring 15 but, of course, the piston will have to move further.

In general, compressed air is supplied and control mechanism is provided so that by operation of the release means, compressed air is first supplied to the cylinder 20 to permit such slippage of the brake as is desired; and means are provided so that after a certain pressure has been reached in the cylinder 20, or at such pressure or above, air will be supplied to the cylinder 24 to give full release of the brake.

The main air control valve is shown in Fig. 1 and in vertical section in Fig. 5. This valve is indicated in general by 25. It is controlled by any suitable operating member, here shown as a foot pedal 26 normally urged upwardly by the tension spring 27. This foot pedal carries the cam 28 upon which rides the cam roller 29, the latter being carried by the arm 30 pivoted at 31 and provided with the lever 32 having an adjustable screw 33, the end of which bears against the ball 34 in the piston 35 in the valve 25. In Fig. 5 the parts are in the position that they occupy when the pedal 26 is completely depressed with the piston 35 in its extreme position to the right. The cam 28 is not concentric about the pivot point 36 of the foot pedal but is shown curved so that as the pedal 26 is depressed the cam roller 29 will move to the left (as viewed in Figs. 1, 5 and 6) so that the lever 32 will rock on the pivot 31 to the right (as viewed in Figs. 1, 5 and 6). In Fig. 6 I have indicated the position.

40 indicates a compressed air supply intake to the valve 25 and it may be assumed, for example, that air is supplied to this pipe from any suitable means (not shown) at a pressure of, say, 75 pounds. It is to be understood, however, that any pressures specifically named herein are not to be considered as limitations but merely as examples to indicate one method of practicing my invention. It is obvious that the particular pressure used will depend upon the particular apparatus, the size of the brake and the size and strength of the spring employed for applying the brake. In other words, the particular pressure will vary under different conditions in accordance with the apparatus employed and the working conditions desired. 41 indicates a piston in the bore 42 in the valve 25. This piston lies against one end of a compression spring 43, the other end of which presses against the piston 35. The piston 41 has a port 44 through it controlled by a ball check valve 45 pressed by the relatively light spring 46 lying inside of the heavier spring 43. The end of the piston 41 carries an extension 41a adapted to unseat the ball check valve 47 (when moved to the left as viewed in Fig. 5) which is yieldingly held closed by the compression spring 48. The port 44 communicates with the chamber 49 communicating with the pipe 50 which leads to the air cylinders 20 and 24. The port 44 also communicates with the exhaust pipe 51, said communication being controlled by the check valve 45.

In Fig. 5 the parts are shown in the position they occupy when the pedal is completely depressed and the brake tightly set by the spring 15. As here shown, the check valve 47 is closed preventing further escape of air and the piston 35 has moved to the right far enough to release the check valve 45 and vent the chamber 49 to atmosphere through the pipe 51. The venting of chamber 49 has also relieved all pressure in pipe 50 and both cylinders 20 and 24 have been vented to atmosphere through the vent valves 60 and 61 which are similar in construction so that there is no air pressure in either cylinder against the spring 15.

When it is desired to slip the brake slightly the pedal 26 is slightly raised. This moves the piston 35 to the left with the result that spring 46 is compressed to seat the valve 45 to shut off the exhaust 51. This movement also compresses the spring 43 to move the piston 41 to open the check valve 47 to admit pressure into the chamber 49 and thence to the pipe 50. The first relatively low pressure thus supplied to the pipe 50 goes only to the cylinder 20 and not to the cylinder 24. The cylinder 20 is connected to the pipe 50 by the pipe 53. This pipe is also connected to the cylinder 24 by the pipe 54 connected to the pipe 55, but the pressure regulator valve 155 is interposed in pipe 54. This pressure regulator valve is shown in Fig. 3 and is so set that it will not open until a predetermined pressure is reached in the pipe 53. For example, it may be set at 60 pounds so that when the pressure in the pipe 53 builds up to 60 pounds it will open and permit air to enter the cylinder 24. This valve 155 has a piston 55a controlled by the spring 55b operating against the ball check 55c in a manner well known in connection with pressure regulators. It will be seen therefore that as the pedal 26 is slowly released relatively low pressure is first admitted to the cylinder 20 to give such slippage to the brake as desired. Owing to some leakage the pedal ordinarily may be held in one position to give the desired slippage. Further release of the pedal, however, will permit more air to enter the pipe 50 to build up the pressure in pipe 53 until valve 155 opens (at, say, 60 pounds) to permit the relatively high pressure to enter the cylinder 24 to give full release to the brake.

The relief valves 60 and 61 are similar in construction and operation. One of these is shown in Fig. 4. Pressure in the pipe 53 raises the ball 70 to close the vent 71. When this pressure is released the ball drops to vent the cylinder to atmosphere through the outlet 72. 80 indicates a check valve in the pipe leading to the lower cylinder. This is the high pressure cylinder and it might be that upon release of pressure in the pipe 50, the pressure in the cylinder might be so great that the vent valve 61 will not release. The check valve 80 permits escape of air from the cylinder 24 back into the pipe 50 when pressure in the latter is reduced. This insures a proper venting of the cylinder 24 when it is desired to release the pressure and apply the brake as when the pedal is completely depressed. When the brake is completely off, that is when the pedal is completely raised, the valve 47 may operate as a pressure regulator valve. That is, if the pressure in chamber 49 builds up to a predetermined point which is the desired maximum, the piston 41 may be pressed to the right far enough to permit the valve 47 to close. This valve may be set, for example, to permit a pressure not exceeding 75 pounds in chamber 49. When the pedal is completely depressed, however, the valve 47 operates merely as a check valve to prevent flow of air into the chamber 49 because then the piston 41 has been moved to the right so far that the valve 47 cannot be unseated.

A general description of the operation of the mechanism will help to understand it. The spring 15 always tends to set the brake. The two air cylinders 20 and 24 when furnished with air pressure release the brake. The control valve 25 is operated by the pedal 26. When the pedal 26 is depressed both air cylinders are vented to atmosphere so that the brake is fully set by the spring. When the pedal is raised air pressure is admitted first to cylinder 20 to release the brake slightly to cause some slippage. When the pressure reaches a predetermined point (say 60 pounds), it is admitted to the cylinder 24 to release the brake still more, to finally give full release. If the pedal be then depressed, both cylinders are vented to atmosphere to start the new cycle to permit the spring to fully set the brake again.

It will be seen that the piston 41 pressed by the spring 43 acts as a pressure regulator. The pressure delivered to the pipe 50 will depend upon the pressure put upon the piston 41 by the spring 43 and it will be seen that the pressure thus imposed on the piston by the spring can be varied by the position of the pedal which controls the position of the part 35. By placing the pedal in different positions, therefore, it is possible to vary the pressure delivered to the pipe 50.

While I have shown and described certain embodiments of my invention, it is to be understood that it is capable of many modifications. Changes, therefore, in the construction and arrangements may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. In combination with a brake having spring pressure tending to apply the brake: a pneumatic cylinder having a short leverage operating against said spring pressure; a pneumatic cylinder having a long leverage operating against said spring pressure; a source of air pressure connected to said cylinders; a control valve for said air pressure; and a pressure regulator valve in the connection to the long leverage cylinder cutting off air pressure to said cylinder below a predetermined minimum pressure.

2. Apparatus as claimed in claim 1 in which the control valve in one position admits pressure to the cylinders and in another position vents said cylinders to atmosphere.

3. Apparatus as claimed in claim 1 in which the control valve has a pressure regulator limiting the pressure supply to the cylinders.

4. Apparatus as claimed in claim 1 in which the control valve in one position admits pressure to the cylinders and in another position vents said cylinders to atmosphere and cuts off the air supply.

5. Apparatus as claimed in claim 1 in which the cylinders are provided with vent valves adapted to be closed when pressure is admitted to the cylinders and opened when said pressure is released.

JOHN W. PAGE.